US006398864B1

(12) United States Patent
Przybysz et al.

(10) Patent No.: US 6,398,864 B1
(45) Date of Patent: Jun. 4, 2002

(54) POTTERY PLASTER FORMULATIONS FOR THE MANUFACTURE OF PLASTER MOLDS

(75) Inventors: Andrzej A. Przybysz, Chicago, IL (US); Jeffrey F. Grussing; Salvatore C. Immordino, both of Trevor, WI (US)

(73) Assignee: United States Gypsum Company, Libertyville, IL (US)

( * ) Notice: Subject to any disclaimer, the term of this patent is extended or adjusted under 35 U.S.C. 154(b) by 0 days.

(21) Appl. No.: 09/451,576

(22) Filed: Nov. 30, 1999

(51) Int. Cl.$^7$ ................................................ C04B 11/00
(52) U.S. Cl. ....................................... 106/772; 106/778
(58) Field of Search ................................... 106/772, 778

(56) References Cited

U.S. PATENT DOCUMENTS

| | | | |
|---|---|---|---|
| 2,391,855 A | | 12/1945 | Bean |
| 3,297,601 A | * | 1/1967 | Maynard et al. |
| 4,443,261 A | | 4/1984 | Nordqvist |
| 4,540,439 A | | 9/1985 | Kurandt |
| 4,906,449 A | | 3/1990 | Kosugi et al. |
| 5,846,317 A | * | 12/1998 | Sattler et al. |
| 6,238,476 B1 | * | 5/2001 | Sprinkle |

FOREIGN PATENT DOCUMENTS

| | | | |
|---|---|---|---|
| DE | 19548655 | * | 6/1997 |
| GB | 1503725 | * | 3/1978 |
| JP | 55053513 | * | 4/1980 |

OTHER PUBLICATIONS

*Interceram*, "Practice and Management A New Technology in Sanitaryware Production: High–Pressure Casting"; R. Ates; vol. 45 No. 6, 1996; pp. 412–413.
*Ulman's Encyclopedia of Industrial Chemistry*, "Calcium Sulfate"; F. Wirsching et al.; vol. A 4; 1985; pp. 555–582.
*Ceramic Industry*, "Sanitaryware Industry Goes Global" Sanitaryware; Aug. 1997; pp. 26–31.
*Tile & Brick International*, "Fundamentals for the Production of Moulding Plaster" D. Klein, C. von Ruffer; vol. 13; 1997; 6 pages.

* cited by examiner

Primary Examiner—Paul Marcantoni
(74) Attorney, Agent, or Firm—Greer, Burns & Crain, Ltd.; John M. Lorenzen; David F. Janci

(57) ABSTRACT

A plaster composition for making molds for reproduction by casting is disclosed. Calcium sulfate hemihydrate, potassium sulfate and potassium sodium tartrate are mixed together. The potassium sulfate and potassium sodium tartrate are in a ratio of from about 1:1 to about 10:1. Potassium sodium tartrate is present in an amount of from about 1 to about 10 pounds per ton of dry calcium sulfate hemihydrate, and the total of the potassium sulfate and potassium sodium tartrate is from about 2 to about 35 pounds per ton of calcium sulfate hemihydrate. Methods of making and using molds of this composition are also disclosed.

11 Claims, No Drawings

POTTERY PLASTER FORMULATIONS FOR THE MANUFACTURE OF PLASTER MOLDS

BACKGROUND ART

Plaster molds are particularly useful in the production of ceramic articles such as dishes, vases, toilets and the like. They are used for casting ceramic articles because of gypsum's favorable water absorption properties. Plaster is also known as calcium sulfate hemihydrate, calcium sulfate semihydrate, calcium sulfate half-hydrate, stucco, or Plaster of Paris. When making a mold, Plaster of Paris is mixed with water to form a slurry. The slurry is then poured over a form, and allowed to hydrate until the setting reaction is complete. As the plaster sets, the hemihydrate form is converted to the dihydrate form through chemical bonding of water to form an interlocking matrix of calcium sulfate dihydrate crystals. As the dihydrate is formed, capillaries are formed in the plaster, giving it the ability to absorb water after the gypsum mold is dry. For use in molds, this ability to absorb water allows the mold to "wick away" water from the clay slip that is poured into the mold to produce "greenware" which must be fired in a kiln to make a ceramic article.

The use of plaster for preparing molds for the production of shaped articles is well known in the art. For example, U.S. Pat. No. 2,391,855 discloses making permeable plaster bodies and the addition of additives to control expansion of the plaster after the initial set. The addition of potassium salts to plaster that is formed into boards or molds is taught in U.S. Pat. No. 4,443,261. Both of these references are hereby incorporated by reference.

In molding pieces of ceramicware, most of the time is used in the process of creating the greenware and then drying the gypsum mold. When the clay slip is poured into the gypsum mold, water is absorbed by the gypsum, allowing the clay particles to deposit on the inner surface of the gypsum mold. Greenware is formed when enough water has been absorbed to allow the cast article to hold its shape and be removed from the mold, although the article is still very fragile at this stage.

The forming process may be accelerated by a process known as medium pressure casting. It includes applying pressure to the clay body while it is still in the mold. Calcined gypsum in the alpha form, which is made by heating gypsum under pressure, produces a mold that is stronger than one formed with beta calcined gypsum and is more suitable for pressure casting. Molds made from alpha gypsum, however, have a disadvantage because the lower porosity of set gypsum formed from alpha calcined gypsum results in longer times to purge and dry the molds.

Gypsum mold materials that absorb water from the clay slip reduce the time required to form greenware. This improves the efficiency of the ceramicware making process by freeing up the mold to be used in casting another article. This is known as "turn over". However, before the gypsum mold can be reused, it must be dried. The water that has been absorbed into the capillaries must be purged from the gypsum mold so that the capillaries will have the capacity to draw sufficient moisture from the next ceramic article. Generally, the gypsum mold is treated with heat or pressure to drive off the absorbed water. Heating or pressurizing the molds to accelerate the drying process also requires costly expenditures of energy. Additionally, the molds begin to deteriorate after many uses because drawing of the water into and out of the capillaries causes erosion. Erosion of the gypsum mold over time, due to gypsum's natural solubility in water, leads to a loss of detail in the gypsum mold which is then transferred to the cast greenware article. Normally a plaster mold can be used for an average of 80 cycles before erosion makes it unusable.

Many additives are known to change the properties of the plaster used in the mold. Molds made from alpha calcined gypsum are stronger, more dense and less porous compared to those manufactured from beta calcined gypsum. In general, additives that improve the hardness of the gypsum mold usually reduce the porosity of the mold. Strength may also be increased by casting a denser gypsum mold; however, this typically has a negative effect on porosity. Loss of porosity reduces both the ability of the mold to wick moisture away from the clay slip, and also reduces the purge rate of the gypsum mold. Thus, although stronger molds may last longer, they may slow down the production of the greenware articles by increasing both the absorption time and the purge time of the gypsum molds. Molds which are difficult to purge also add to the expense of the process by requiring higher energy usage in the drying process.

Some of these problems have been solved by the use of resin molds in place of gypsum molds for casting of ceramic articles. These molds provide fast turnover of the mold, but the resins used therein are considerably more expensive than gypsum—based compositions. Resin molds must also be made from special machinery. This adds to the cost of the process as the design of the mold needs to be outsourced. In addition, resin molds are only cost effective for large production volumes as the molds are costly to make, store, and maintain.

It is therefore an object of this invention to provide improved gypsum molds for casting of ceramic articles that have enhanced absorption and purge rates.

It is another object of this invention to provide an inexpensive mold that retains strength for long life in addition to an increase in absorption and purge rate of absorbed water.

It is yet another object of this invention to provide an energy efficient mold for producing ceramic articles that does not require large amounts of energy to be expended to purge and dry the mold.

It is still another object of this invention to improve efficiency of production of ceramic articles by reducing the turn over time required to prepare molds for casting of another article.

It is another object of this invention to provide an improved mold formed from alpha calcined gypsum that absorbs water more quickly during pressure casting and reduces the time required to form the greenware.

DISCLOSURE OF INVENTION

The above-listed objects are met or exceeded by the present invention, which features a gypsum composition that produces an improved mold for casting ceramic articles. The mold has the improved ability to draw moisture from the article being cast, allowing it be produced faster, especially during pressure casting. Drying of the gypsum mold after use is also more efficient as it can be purged of the absorbed moisture more readily than a conventional gypsum mold. These improvements in absorbing and purging of water are done in a manner that does not compromise the strength of the mold or the efficiency of the casting process.

More specifically, the present invention provides a plaster composition for making gypsum molds for the manufacture of ceramicware. The plaster composition is comprised of a calcium sulfate hemihydrate, one or more of ammonium sulfate and potassium sulfate and one or more of ammonium L tartrate and potassium sodium tartrate. A weight ratio of from about 1:1 to about 10:1 of one or more of ammonium sulfate and potassium sulfate to one or more of ammonium L tartrate and potassium sodium tartrate must be maintained. The one or more of potassium sodium tartrate and ammonium L tartrate is present in an amount of from about 1 to about 10 pounds per ton of dry calcium sulfate hemihydrate, and the total of the ammonium sulfate, potassium sulfate, ammonium L tartrate and potassium sodium tartrate is from about 2 to about 35 pounds per ton of the dry hemihydrate.

Applicants have found that the combination of potassium sodium tartrate and potassium sulfate in a specified ratio produces a gypsum mold with a pore structure that facilitates enhanced purging of the water from the mold in preparation for its subsequent use. An improved mold made of alpha calcined gypsum also facilitates absorption of water during pressure casting. Ease in drying of the mold means that less energy is required in terms of pressure or heat to drive off the water that was absorbed by the mold's capillaries during the process of casting the greenware. Less energy usage reduces the cost of the process. Ease in drying out the mold could, in some cases, also lead to a more efficient process because the molds could be more rapidly turned around and be ready for casting of a subsequent article.

The ease with which the water flows into and out of the capillaries of the mold is also evidenced by a greater turn over rate. Molds made from a traditional composition can be used to make an average of 80 articles before they become unusable. Life spans of 100–120 cycles have been achieved using the composition of the present invention. Increased mold life leads to reduced cost and a more efficient process.

Typical gypsum compositions utilize a higher water to plaster ratio for the purpose of increasing pore structure which, in turn, will enhance absorption and purge properties. The higher water to plaster ratio tends to lower mold life and strength. Applicants' composition allows for increased absorption and purge properties at discernibly lower water/plaster ratios which provide higher strength and longer mold life. The addition of potassium sodium tartrate is generally known to reduce the strength of plaster compositions. However, the proportions of potassium sulfate and potassium sodium tartrate lead to a composition which maintains good strength while providing an improved pore structure that allows it to more efficiently absorb and purge out water from the mold when cast at a lower water to stucco ratio.

Yet another result of this composition is the improvement in the energy efficiency of the drying process and the pressure casting process. This efficiency is seen both during mold drying and, if the gypsum mold is formed from alpha calcined gypsum, during absorption of water from the greenware while pressure casting. If capillary flow is restricted, more energy must be expended to dry the mold for its next use. Molds may be dried by heat, pressure or a combination of the two. Regardless of which of these processes is used to dry the mold, the energy cost for the overall process can be reduced if temperature and pressure can be reduced. The composition and molds of the present invention allow temperature and/or pressure to be reduced while purging moisture from the mold, resulting in an energy efficient process. If pressure casting is used, lower pressure or less time in the pressurized environment is required where there is less resistance to capillary flow.

An improved mold may be made from a plaster slurry that is made of calcium sulfate hemihydrate, one or more of ammonium sulfate and potassium sulfate, one or more of ammonium L tartrate and potassium sodium tartrate and water in the same proportions as above. After the slurry is mixed, it is poured on a pattern to make a mold and allowed to set. When set, the pattern is removed from the mold then dried. A mold made in this manner is purged more quickly than molds made from prior art processes, which allows the user to reduce energy costs by drying with lower temperatures or pressures. Additional cast articles may also be produced for the same cost using the method of the present invention by speeding up the drying process and turning over the molds for re-use more quickly.

Processes which utilize this composition also manifest these advantages as well. In an improved method of making cast articles, cast articles are produced using a mold made from calcium sulfate hemihydrate, one or more of ammonium sulfate and potassium sulfate, one or more of ammonium L tartrate and potassium sodium tartrate and water. A weight ratio of from about 1:1 to about 10:1 of one or more of ammonium sulfate and potassium sulfate to one or more of ammonium L tartrate and potassium sodium tartrate may be used to make the mold. Articles are cast by pouring clay slip into the mold and allowing the slip to set. After removing the article from the mold, the mold is then purged to remove most of the absorbed water, then dried. Due to the increased purging rate, energy usage may be reduced, or the mold may be turned over more quickly to produce additional cast articles in the same time frame.

BEST MODE OF CARRYING OUT THE INVENTION

The present invention provides a plaster composition for making gypsum molds for the manufacture of ceramic articles which are more easily purged of absorbed water than prior art molds. Drying is a generic term for the removal of water from the mold, whereas purging is removing water by the application of pressure. In a preferred embodiment of the invention, the composition comprises a fluid mix of a calcium sulfate hemihydrate, water, potassium sulfate and potassium sodium tartrate.

The potassium sulfate and potassium sodium tartrate are present in a weight ratio of from about 1:1 to about 10:1. In a preferred embodiment, the weight ratio of potassium sulfate to potassium sodium tartrate is from about 2.5:1 to about 10:1. The potassium sodium tartrate is present in an amount of from about 1 to about 10 pounds per ton of plaster composition. The total of the potassium sulfate and potassium sodium tartrate is from about 2 to about 35 pounds per ton of dry calcium sulfate hemihydrate. When it is desired to use larger amounts of potassium sodium tartrate, a ratio of potassium sulfate at the lower end of the range of 2.5:1 to about 10:1 must be selected in order to keep the maximum amount of additives within the preferred limits. Although the discussion focuses on the preferred embodiment, it is understood that ammonium sulfate may be substituted for some or all of the potassium sulfate and ammonium L tartrate may be substituted for some or all of the potassium sodium tartrate.

A plaster composition starting material comprises calcium sulfate hemihydrate. This may be in either the alpha or beta form or any combination thereof. It is made by converting calcium sulfate dihydrate to calcium sulfate hemihydrate by the following reaction formula:

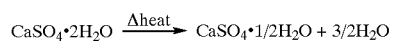

This reaction can be carried out by calcination, or any other methods known in the art. Calcination utilizes heat to drive off some of the water of hydration under extremely controlled conditions. A small percentage of calcium sulfate hemihydrate may be completely removed of chemically bound water forming a calcium sulfate anhydrite impurity. The calcination process requires large amounts of energy to drive off water and must be carefully controlled to retain the correct water of hydration. It is also known to prepare the calcium sulfate hemihydrate using sulfuric acid at temperatures above 80° C. These and other methods of reducing the water of hydration to obtain the hemihydrate are well known to those skilled in the art.

Calcium sulfate hemihydrate may produce at least two crystal forms. The alpha calcined gypsum forms less a circular crystals that pack tightly together, making a denser and stronger plaster. The crystal morphology allows water to flow easily between the crystals, requiring less water to form a flowable slurry. It is made by a continuous process whereby the calcium sulfate dihydrate is heated under pressure. More elongated crystals are characteristic of the beta calcined gypsum. This crystal structure results in a less dense product because the crystals are more loosely packed. The beta form also requires more water to fluidize the gypsum. If the calcining of the dihydrate is performed at ambient pressure, the beta form is obtained. Often it is advantageous to mix alpha and beta forms to produce a plaster with intermediate values of porosity and strength. Regardless of the form, alpha or beta, the set gypsum formed by the present invention has an improved ability to quickly purge the mold to dry it. The additives of the present invention provide increased purgability of molds, whether they are constructed from alpha-hemihydrate, beta-hemihydrate or mixtures thereof.

In order to create a gypsum mold, the calcium sulfate hemihydrate is mixed with water to form a slurry. Some of the water reacts with the calcium sulfate hemihydrate and anhydrite, if present, in the hydration process, essentially reversing the chemical formula given above. As the hemihydrate absorbs the water, crystals of the dihydrate start to form. These crystals grow and form an interlocking matrix of set gypsum crystals that has pores and capillaries in the crystal matrix. This matrix gives gypsum molds a high capacity for capillary action and allows water to be wicked away from the clay slip, forming greenware. The water is then either forced through and out of the mold or stored in the capillaries of the gypsum mold until the greenware is removed. The gypsum mold is then dried and/or purged of the water in preparation for the next use.

Addition of potassium sulfate and potassium sodium tartrate change the pore structure in the dihydrate as it forms. The resulting changed pore structure facilitates the removal of water either through purge and/or the use of heat. In addition, the changed pore structure allows for better absorption properties of gypsum formed at lower water to plaster ratios.

Amounts of the additives are critical. Potassium sulfate and potassium sodium tartrate may be dry mixed with the calcined gypsum or added directly to the mix water. If too much potassium sodium tartrate is added, the resulting plaster has reduced strength, and the mold does not hold up well to multiple uses. The potassium sodium tartrate, also known as Rochelle Salt, must be added in quantities of not more than 10 pounds per ton of calcium sulfate hemihydrate. Less than one pound of potassium sodium tartrate per ton of the hemihydrate is not as effective in increasing the purge rate of the mold.

The total amounts of the salts and the ratio of the potassium sulfate to the potassium sodium tartrate are also critical. Too much salt destroys the strength of the mold. No more than 35 pounds of additives per ton of calcium sulfate hemihydrate may be added to the plaster composition. The weight ratio of the potassium sulfate to the potassium sodium tartrate should not be less than 1:1, nor greater than 10:1. Before addition to the plaster composition, the additives should be ground until no more than 10% is retained on a 50 mesh sieve.

Ammonium L tartrate is chemically suitable for use in this composition in place of potassium sodium tartrate, however, it is not as readily available in quantities that would be necessary for a commercial process. Further, less pure forms of ammonium L tartrate have been found to cause a discoloration in the mold which usually renders it unacceptable to the ceramic manufacturer. Ammonium sulfate may be used in place of potassium sulfate.

The additive combination of the present invention cannot be used when the plaster composition contains alkaline additives such as Portland Cement and/or lime. The resulting pH of the slurry interacts with the potassium sulfate and potassium sodium tartrate additives in such a way that the mixture exhibits an extremely long set time.

Mixtures of potassium sulfate and/or potassium sodium tartrate have been known in the art to control mold expansion during the setting process. During the setting process, expansion occurs as crystal growth begins. In creating the gypsum mold, this is undesirable because it can lead to distortion in the shape of the mold. A commercial plaster mixture, #1 Pottery Plaster LE available from USG Corporation, contains a plaster mixture which includes 4 pounds per ton of potassium sulfate and 2 pounds per ton of potassium sodium tartrate. This mixture is used when it is necessary to reduce the amount of expansion that occurs as the dihydrate crystals form. Expansion in the gypsum mold can lead to distortion of the finished ceramic piece.

However, a significant development of the present invention is that some combinations of ratios of additives have been found to significantly increase the purge rate and absorption of gypsum molds when used to make cast articles. This blend of additives is previously unknown for this purpose. Further, in some preferred embodiments, higher ratios of potassium sulfate to potassium sodium tartrate are used compared to known commercially available plaster mixtures.

Other additives may be added where use of the mold requires particular properties. Sodium trimetaphosphate may be added to the composition to improve both the strength and the purge rate of the finished molds. It may be added at the rate of about 1 pound of sodium trimetaphosphate per ton of calcium sulfate hemihydrate to about 5 pounds per ton. Preferably, the additive is present in amounts from about 1 to about 3 pounds per ton. Polyethylene glycol is another optional additive. The addition of this material also gives slight improvements in the mold strength, and it prevents migration of other additives, such as potassium sodium tartrate, to the surface of the mold. Polyethylene glycol also acts as a lubricant, aiding in the release of the greenware from the mold. It may be added in amounts up to about 20 pounds per ton, preferably from about 0.5 to about 10 pounds per ton. Retarders known in the art, such as tartaric acid, proteinaceous retarders, citric acid or ammonium tartrate may be used to better control the setting process if desired. Reinforcing materials may be added where increase in strength of the mold is required. Except as previously noted, other additives known to those skilled in the art may be used in conjunction with this invention.

PRIOR ART EXAMPLE 1

A control article was made from a plaster composition made from calcium sulfate beta-hemihydrate. A sample of this composition was mixed at a 72 cc consistency to form a slurry. A consistency of 72 cc is defined as a mixture of 72 cc of water per 100 grams of plaster. Approximately 22 pounds of slurry was cast into the shape of a block containing 4 air channels and allowed to hydrate. Water purge rate was tested by applying compressed air to the block via the air channels for 30 minutes after Vicat set. Vicat set time is defined as the time during which a 300 gram Vicat needle per ASTM C-472 will freely penetrate of its own weight halfway into the thickness (about 1 inch) of plaster in an approximately 6 ounce capacity cup. Air under pressure was forced through the cast article, and the amount of water displaced was collected and measured as follows:

| Elapsed Time | Pressure, PSI | Weight of water collected |
| --- | --- | --- |
| 5 Minutes | 30 | 592 grams |
| 20 Minutes | 30 | 1327 grams |
| 20–25 Minutes | 80 | 447 grams |

The total water collected was 2366 grams. No cracking or breaking of the sample was noted during the test.

EXAMPLE 2

The composition of the present invention was used to produce an article made from calcium sulfate beta-hemihydrate, 8 pounds of potassium sulfate per ton of calcium sulfate beta hemihydrate, 2 pounds of potassium sodium tartrate per ton of calcium sulfate beta hemihydrate and 0.3 pounds of sodium citrate ton of calcium sulfate beta hemihydrate mixed with sufficient water to form a slurry with a consistency of 72 cc. Approximately 22 pounds of slurry was cast into the shape of a block containing 4 air channels and allowed to hydrate. Water purge rate was tested by applying compressed air to the block via the air channels 30 minutes after Vicat set. Air under pressure was forced through the cast article, and the amount of water displaced was collected and measured as follows:

| Elapsed Time | Pressure, PSI | Weight of water collected |
| --- | --- | --- |
| 5 Minutes | 30 | 1540 grams |
| 20 Minutes | 30 | 2117 grams |
| 20–25 Minutes | 80 | 351 grams |

The total water collected was 4008 grams. No cracking or breaking of the sample was observed during the test.

EXAMPLE 3

A sample article, also of the present invention, was made from calcium sulfate beta-hemihydrate, 6 pounds of potassium sulfate per ton of calcium sulfate beta hemihydrate, 1 pound of potassium sodium tartrate per ton of calcium sulfate beta hemihydrate and 0.16 pounds of sodium citrate per ton of calcium sulfate beta hemihydrate mixed with sufficient water to form a slurry with a consistency of 72 cc. Approximately 22 pounds of slurry was cast into the shape of a block containing 4 air channels and allowed to hydrate. Water purge rate was tested by applying compressed air to the block via the air channels 30 minutes after Vicat set. Air under pressure was forced through the cast article, and the amount of water displaced was collected and measured as follows:

| Elapsed Time | Pressure, PSI | Weight of water collected |
| --- | --- | --- |
| 5 Minutes | 30 | 925 grams |
| 20 Minutes | 30 | 1668 grams |
| 20–25 Minutes | 80 | 516 grams |

The total water collected was 3109 grams. No cracking or breaking of the sample was noted during the test.

Example 1 is a control sample, showing the amount of water purged from a plaster sample made without the additives of the present invention. Two different levels of potassium sulfate and potassium sodium tartrate are demonstrated in Examples 2 and 3. The composition of the present invention shows a clear increase in the amount of water collected from the samples during the same time period. Example 2, containing 8 pounds of potassium sulfate per ton and 2 pounds of potassium sodium tartrate per ton, shed almost twice as much water as the control sample.

PRIOR ART EXAMPLE 4

A prior art sample article was made from 1485 parts No. 1 Moulding Plaster, 510 parts HYDROCAL® C-Base, 5 parts potassium sulfate, 2.5 parts dextrose and 1.3 parts retarder mixed with sufficient water to form a slurry with a consistency of 55 cc. No. 1 Moulding plaster is a calcium sulfate beta-hemihydrate available through USG Corporation, and is typical of a plaster used for molds. HYDROCAL® C-Base, supplied by USG Corporation, is the alpha form of calcium sulfate hemihydrate. The retarder is an additive to lengthen the set time of the product. Dextrose, here Staleydex 444 available from A. E. Staley, is a thermal shock additive that reduces cracking when the mold is exposed to rapid changes in temperature. An air pressure purge test was conducted on a cast 4×8 inch cylinder. The amount of water displaced and collected was measured as follows:

| Elapsed Time | Pressure, PSI | Weight of water collected |
| --- | --- | --- |
| 5 Minutes | 30 | 206.9 grams |
| 20 Minutes | 30 | 63.5 grams |
| 20–25 Minutes | 80 | 75.6 grams |

The total water collected was 346.0 grams.

EXAMPLE 5

A sample article of the present invention was made from 1485 parts No. 1 Moulding Plaster, 510 parts HYDROCAL® C-Base, 3 parts of potassium sodium tartrate, 5 parts potassium sulfate, 2.5 parts dextrose and 1.0 part retarder mixed with sufficient water to form a slurry with a consistency of 55 cc. The dextrose used was Staleydex 444 available from A. E. Staley. An air pressure purge test was conducted on a cast 4×8 cylinder. The amount of water displaced and collected was measured as follows:

| Elapsed Time | Pressure, PSI | Weight of water collected |
| --- | --- | --- |
| 5 Minutes | 30 | 276.7 grams |
| 20 Minutes | 30 | 35.8 grams |
| 20–25 Minutes | 80 | 47.4 grams |

The total water collected was 359.9 grams.

EXAMPLE 6

A sample article of the present invention was made from 1485 parts No. 1 Moulding Plaster, 510 parts HYDRO-CAL® C-Base, 3 parts of potassium sodium tartrate, 5 parts ammonium sulfate, 6 parts sodium trimetaphosphate, 2.5 parts dextrose and 2.0 parts retarder mixed with sufficient water to form a slurry with a consistency of 55 cc. An air pressure purge test was conducted on a cast 4×8 inch cylinder. The amount of water displaced and collected was measured as follows:

| Elapsed Time | Pressure, PSI | Weight of water collected |
| --- | --- | --- |
| 5 Minutes | 30 | 323.2 grams |
| 20 Minutes | 30 | 23.9 grams |
| 20–25 Minutes | 80 | 38.3 grams |

The total water collected was 385.4 grams.

Examples 4, 5 and 6 were made with different forms of calcium sulfate hemihydrate compared to Examples 1, 2 and 3. All calcium sulfate hemihydrate was supplied by USG Corporation. Plaster slurries prepared with the alpha form of calcium sulfate hemihydrate require the addition of less water than those using the beta form. The difference in consistency between the alpha and beta forms of calcium sulfate hemihydrate is related to a difference in crystal morphology. The use of potassium sulfate without the addition of potassium sodium tartrate is shown in Example 4. In Example 5, the amount of water purged has increased with the addition of potassium sodium tartrate. The purge rate further increases in Example 6, where an optional ingredient, sodium trimetaphosphate, is also added.

Data show that the present invention increases the amount of water that is expelled from the mold early in the purge process independent of the hemihydrate form utilized. Examples 2 and 3 show that, compared to Example 1 without potassium sulfate and potassium sodium tartrate, a larger percentage of the water that was purged was done so in the first 5 minutes. Likewise, the percentage of the water purged in the first 5 minute interval increased from less than 60% in comparative Example 4 to more than 75% in Examples 5 and 6 using the composition of the present invention. The addition of effective quantities of the additives taught in the present invention leads to an increase in the amount of water collected in the first five minutes of the purge cycle.

The composition of the present invention may be used in a process to make gypsum molds for use in casting greenware. Potassium sulfate and potassium sodium tartrate additives are prepared by grinding them such that no more than 10% of the material is retained on a 50 mesh sieve. A mixture of a calcium sulfate hemihydrate, potassium sulfate and potassium sodium tartrate is made by dry blending. The potassium sulfate and the potassium sodium tartrate are in a ratio of about 1:1 to about 10:1. The potassium sodium tartrate is present in an amount of about 1 to about 10 pounds per ton of calcium sulfate hemihydrate, and the total of the potassium sulfate and the potassium sodium tartrate is from about 2 to about 35 pounds per ton of plaster composition. Additional substances that are known in the art may be added to impart specific properties to the gypsum mold. The blend is then mixed with water to form a slurry, it is poured on the master pattern to be molded and allowed to set. After the mold is set and removed from the pattern, the gypsum mold is dried. Drying of the mold may including an optional purging step.

Ceramic articles may be made using molds made from the composition of the present invention. In the preferred embodiment, the mold is made from a composition comprising calcium sulfate hemihydrate, potassium sulfate, potassium sodium tartrate and water. Ammonium sulfate may be used in place of potassium sulfate and ammonium L tartrate may be used in place of potassium sodium tartrate. Other additives may also be added as are known in the art. After the mold is formed and conditioned, greenware is made by pouring clay slip into the gypsum mold. The gypsum mold will absorb water from the clay slip, helping to form the greenware. If the mold is made of calcium sulfate alpha hemihydrate, pressure casting may be utilized to enhance the rate of water absorption from the greenware. Once the greenware is formed, the article is removed from the gypsum mold. The gypsum mold is then purged of the absorbed water in preparation for casting another article. The mold may be further dried by heating in an oven or allowing the residual moisture to evaporate at room temperature.

While a particular embodiment of the composition and process for making gypsum molds for reproduction by casting has been shown and described, it will be appreciated by those skilled in the art that changes and modifications may be made thereto without departing from the invention in its broader aspects and as set forth in the following claims.

What is claimed is:

1. A plaster composition for making molds for reproduction by casting having increased water purge rate comprising a fluid mix of a calcium sulfate hemihydrate, water, one of ammonium sulfate or potassium sulfate and one of ammonium L tartrate or potassium sodium tartrate, wherein said one of ammonium sulfate or potassium sulfate and said one of ammonium L tartrate or potassium sodium tartrate are in a ratio of from about 2.5:1 to about 10:1, said one of ammonium L tartrate or potassium sodium tartrate is present in an amount of from about 1 to about 10 pounds per ton of dry calcium sulfate hemihydrate, and the total of said one of ammonium sulfate or potassium sulfate and one of ammonium L tartrate or potassium sodium tartrate is from about 3.5 to about 35 pounds per ton of calcium sulfate hemihydrate.

2. The composition of claim 1 wherein said one of ammonium L tartrate or potassium sodium tartrate is potassium sodium tartrate.

3. The composition of claim 1 wherein said one of ammonium sulfate or potassium sulfate is potassium sulfate.

4. The composition of claim 2 wherein said one of ammonium sulfate or potassium sulfate is potassium sulfate.

5. The composition of claim 1 further comprising sodium trimetaphosphate in amounts of about 1 pound per ton of calcium sulfate hemihydrate to about 5 pounds per ton.

6. The composition of claim 1 further comprising polyethylene glycol in amounts up to about 20 pounds per ton of calcium sulfate hemihydrate.

7. The composition of claim 4 further comprising sodium trimetaphosphate in amounts of about 1 pound to about 5 pounds per ton of calcium sulfate hemihydrate.

8. The composition of claim 4 further comprising polyethylene glycol in amounts up to about 20 pounds per ton of calcium sulfate hemihydrate.

9. The composition of claim 7 further comprising polyethylene glycol in amounts up to about 20 pounds per ton of calcium sulfate hemihydrate.

10. The composition of claim 1 wherein said one of ammonium sulfate or potassium sulfate and one of ammonium L tartrate or potassium sodium tartrate are present in amounts such that the resulting mold releases more water in the first five minutes during purging than a composition not containing said one of ammonium sulfate or potassium sulfate and one of ammonium L tartrate or potassium sodium tartrate.

11. A mold made for reproduction of patterns by using the plaster composition of claim 1.

* * * * *